(12) United States Patent
Benisty et al.

(10) Patent No.: US 12,519,824 B2
(45) Date of Patent: Jan. 6, 2026

(54) INFECTION DETECTION IN A STORAGE ARRAY

(71) Applicant: Dell Products L.P., Round Rock, TX (US)

(72) Inventors: Lior Benisty, Beer Sheva (IL); Efi Levi, Beer Sheba (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 253 days.

(21) Appl. No.: 18/154,676

(22) Filed: Jan. 13, 2023

(65) Prior Publication Data

US 2024/0244077 A1 Jul. 18, 2024

(51) Int. Cl.
*H04L 9/40* (2022.01)

(52) U.S. Cl.
CPC .......... *H04L 63/145* (2013.01); *H04L 63/205* (2013.01)

(58) Field of Classification Search
CPC .................... H04L 63/205; H04L 63/145
See application file for complete search history.

(56) References Cited

U.S. PATENT DOCUMENTS

| | | | | |
|---|---|---|---|---|
| 7,840,992 B1 * | 11/2010 | Dufrene | ............ | G06F 11/1461 726/1 |
| 8,087,061 B2 * | 12/2011 | Jarrett | .................. | G06F 21/568 726/1 |
| 8,135,981 B1 * | 3/2012 | Gawali | ............... | G06F 11/0727 714/42 |
| 10,019,323 B1 * | 7/2018 | Bai | ...................... | G06F 11/1004 |
| 10,650,146 B1 * | 5/2020 | Gaurav | ................. | G06F 21/562 |
| 11,010,409 B1 * | 5/2021 | Dangi | ................. | G06F 16/1844 |
| 11,170,104 B1 * | 11/2021 | Stickle | .................... | G06N 20/00 |
| 11,663,336 B1 * | 5/2023 | Armangau | ............. | G06F 21/60 726/23 |
| 12,081,583 B2 * | 9/2024 | Bender | ................ | H04L 63/145 |
| 2010/0138921 A1 * | 6/2010 | Na | ...................... | H04L 63/1458 726/22 |
| 2012/0124386 A1 * | 5/2012 | Lin | ..................... | G06F 21/6218 726/17 |
| 2018/0107824 A1 * | 4/2018 | Gibbons, Jr. | ......... | G06F 21/565 |
| 2020/0099699 A1 * | 3/2020 | Saad | ................... | G06F 11/2076 |
| 2021/0133036 A1 * | 5/2021 | Behera | ................ | G06F 11/1464 |

(Continued)

*Primary Examiner* — Mohammad A Siddiqi

(74) *Attorney, Agent, or Firm* — Amin, Turocy & Watson, LLP

(57) ABSTRACT

A network storage array may detect a malware infection and report the detected infection to a monitoring system, which may monitor more than one storage array at one or more data centers via one or more array management host computing systems. Storage arrays may report to the monitoring system replication information regarding data replication operations among the arrays. The monitoring system may receive access information regarding access of the storage arrays by server host computing systems. Based on the access and replication information the monitoring system may determine, or infer, an infection of an array, or a volume of an array, which array or volume may not be capable of self-determining an infection. The monitoring system may cause a mitigation action with respect to an infected array or with respect to a server host computing system that may have accessed an infected array.

20 Claims, 10 Drawing Sheets

(56) References Cited

U.S. PATENT DOCUMENTS

| | | | |
|---|---|---|---|
| 2021/0336968 A1* | 10/2021 | Bender | H04L 63/145 |
| 2022/0083657 A1* | 3/2022 | Karr | G06F 11/108 |
| 2023/0239318 A1* | 7/2023 | Fellows | H04L 63/1433 |
| | | | 726/23 |
| 2024/0249031 A1 | 7/2024 | Levy et al. | |
| 2024/0320340 A1* | 9/2024 | Vt | G06F 21/568 |

\* cited by examiner

INFECTION DETECTION IN A STORAGE ARRAY

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items them make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise a hard drive, random access memory, ("RAM"), and central processing unit ("CPU") resources.

Data storage computer systems or components can facilitate the storage and manipulation of data by a variety of different network equipment. Data may be stored on a network storage component, which may be referred to as a storage, and which may comprise a hard drive, a magnetic media drive, a solid-state drive, a memory, and the like. Manipulation may refer to one or more actions performed to a storage unit, such as a file, or files, which actions may comprise reading, writing, copying, moving, deleting, and the like. Problems can occur when malware secretly controls operation of otherwise authorized data manipulation equipment, which may include a legitimate user's computer that has legitimate access to the storage. In some circumstances, combinations of different file sharing commands can be used to cause adverse events on storage equipment. For example, file read instructions, or commands, can be used by malware, along with removal instruction, or commands, to obtain unauthorized access to data of an organization stored on a network storage. These problems can be further exacerbated when data is stored and accessed within, or from, a cloud-based environment. A computing system that is associated with a unique identifier, such as, for example, an Internet Protocol ("IP") address and that facilitates a computing service process, or infrastructure may be referred to as a host computer, or a host computing system.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method may comprise receiving, by a monitoring system of a first computing system comprising a processor, a first infection notification indicative of a first infection of a first storage array. The first storage array may be capable of determining the first infection and may self-generate the first infection notification. The first infection notification may be received by the monitoring system via an array management host computing system. The array management host computing system may be a computing system that executes array management software or that may manage the first storage array or that may manage other storage arrays. The monitoring system may comprise a computer room computing system of a data center or may comprise monitoring system software. The monitoring system software and the storage array management host computing system may execute on, or run on, the same computing system or different computing systems, which different computing systems may be located in a data center or may be distributed so that the different computing systems are not all located at the data center.

The example method may further comprise receiving, by the monitoring system, a first replication notification indicative of a first replication of a data portion of the first storage array to a second storage array. The first replication notification may be receives from the first storage array or from the second storage array, or from a first array management host computing system or a second array management host computing system, corresponding to the first storage array or the second storage array, respectively. The example method may further comprise, based on the first replication notification, determining, by the monitoring system, a second infection of the second storage array to result in a determined second infection, and based on the determined second infection, causing, by the monitoring system, a mitigation action corresponding to the second storage array. The first infection may be determined, or self-determined, by the first storage array. The second storage array may not be configured to, or may not be capable of, self-determining an infection. In an embodiment, the first storage array may be configured to be able to detect infection, and the second storage array may be unable to detect infection.

The mitigation action may comprise restricting access to the second storage array. The mitigation action may comprise alerting a server host computing system that it may be infected or restricting access by the server host computing system to a storage array monitored by the monitoring system.

In an embodiment, the example method may further comprise receiving, by the monitoring system, a first access indication indicative of accessing of the first storage array by a second computing system, wherein the first access indication is generated by the first storage array, and wherein the first access indication comprises a host name corresponding to the second computing system. The first access indication may be received from a storage array management host computing system that may manage the first storage array. The second computing system may comprise a server production host computing system. The example method may further comprise receiving, by the monitoring system, a second access indication, indicative of accessing of the second storage array by the second computing system, wherein the second access indication is generated by the second storage array, and wherein the mitigation action comprises directing, to the host name, an infection alert indicative of possible infection of the second computing system. The second access indication may be received from a storage array management host computing system that may manage the second storage array. The mitigation action may comprise directing an infection alert to a second computing system that has accessed the second storage array, and wherein the infection alert is indicative of possible infection of the second computing system due to access by the second computing system of the second storage array. The second computing system may comprise a server production host computing system. The first access indication may comprise a host name corresponding to the second computing system, and the infection alert may be directed to the second computing system according to host name of the second computing system.

In an embodiment, the example method may further comprise receiving, by the monitoring system, a first access indication indicative of accessing of the first storage array by a second computing system, and receiving, by the monitoring system, a second access indication indicative of accessing of the second storage array by the second computing system, wherein the determining of the determined second infection is based on the first access indication and the second access indication. Access by the second computing system of the first storage array that has self-determined a malware infection may be used by the monitoring system to infer that the second computing system has become infected by the access of the infected first storage. The access indication may be further used by the monitoring system to infer, or otherwise determine, that accessing the infected first storage array has infected the second computing system and that accessing by the second computing system of the second storage array has infected the second storage array.

The example method may further comprise receiving, by the monitoring system, a first access indication indicative of access, by a second computing system, of the data portion, wherein the mitigation action comprises notifying the second computing system of the determined second infection.

The example method may further comprise receiving, by the monitoring system, a first access indication indicative of access by a second computing system, such as a of a third storage array. The example method may further comprise determining, by the monitoring system, that the third storage array is configured to receive a second replication of the data portion. The example method may further comprise generating, by the monitoring system, a third infection notification corresponding to the third storage array based on the third storage array being configured to receive the second replication. The example method may further comprise causing, by the monitoring system, a mitigation action corresponding to the third storage array.

The first replication may be performed according to an Active-Active replication operation. The first replication may be performed according to a data push replication operation. The data portion may be a portion of a storage unit that comprises a logical volume. The first replication may comprise replicating of the storage unit to the second storage array. The first replication may comprise replicating of a logical volume to the second storage array.

In another embodiment, an example server equipment, on which monitoring system software may be executing, may comprise a processor, configured to receive, from a first host computing system corresponding to a first storage array, a first infection notification indicative of a first infection of a first storage unit of the first storage array. The server equipment may comprise, may compose, or may be associated with, a data center. The server may be referred to as a data room computer. The server equipment may be further configured to receive a replication notification indicative of a replication of data of the first storage unit to a second storage unit of a second storage array. The server equipment may be further configured to determine, based on the replication notification, a second infection of the second storage unit, resulting in a determined second infection. The server equipment may be further configured to, responsive to the determined second infection, cause a mitigation action corresponding to the second storage unit. The server equipment may receive replication notification or the infection notification via one or more array host computing systems corresponding to the first storage array or the second storage array.

In an embodiment the second storage array corresponds to a second host computing system that receives, from the second storage array, an access indication that is indicative of access of the first storage unit by a third host computing system. The processor of the server equipment may be further configured to receive the access indication from the second host computing system. The access indication comprises a host name corresponding to the third host computing system. The determined second infection is determined based on the access indication. In an embodiment, the first infection notification may be determined by the first storage array based on one or more server message block commands determined by the first storage array to violate a configured infection detection criterion. For example, an unusual pattern of one or more of SMB_READ, SMB_WRITE, or SMB_COPY commands, as determined at the first storage array, may be deemed by the first storage array to correspond to a malware infection.

In yet another embodiment, a non-transitory machine-readable medium may comprise executable instructions that, when executed by a processor of a monitoring computing system (on which monitoring software may be executing or running), facilitate performance of operations, comprising: receiving, from a first management computing system corresponding to a first storage array of a first data center, a first malware notification indicative of a first malware presence on a first logical volume of the first storage array. The operations may further comprise receiving, from a second management computing system corresponding to a second storage array of a second data center, a replication notification indicative of a replication of data of the first logical volume to a second logical volume of the second storage array, and receiving, from the second management computing system, an access indication indicative of an access by a host computing system of the second logical volume. The host computing system may comprise, for example: an EPIC server production host computing system, a SQL server production host computing system, an Oracle server production host computing system, or a database server production host computing system, or other server production host computing systems configured for other types of computing services. The operations may further comprise determining, based on the replication notification, a second malware presence on the second logical volume. The operations may further comprise directing, to the host computing system, responsive to the access indication, a mitigation instruction message that comprises an instruction for the host computing system to implement a mitigation action.

In an embodiment, the host computing system may not be located at the first data center or the second data center. The access indication may comprise a host name corresponding to the host computing system. The mitigation instruction message may be directed to the host name. The first storage array may be configured to detect malware and the second storage array may not be configured to detect malware.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage, such as unauthorized appropriation of data stored to a data store occurs. A data store, such as a hard drive, a magnetic disc drive, a solid-state drive, a memory, and the like, may be referred to as a storage, and may be implemented as a storage that is accessible to multiple computing device. A storage may be a cloud storage that is accessible by multiple computing devices via a network.

One having skill in the relevant art(s), given the description herein, appreciate that different types of malware and other adverse conditions can be handled in some circumstances, including, but not limited to, ransomware, file tampering, denial of service attacks, and data leakage. For example, in one or more embodiments, the resource sharing can be combination of commands issued by the first network equipment that improperly accesses resources stored by the second network equipment, e.g., a data leakage attack. Additional illustrative examples are provided below.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
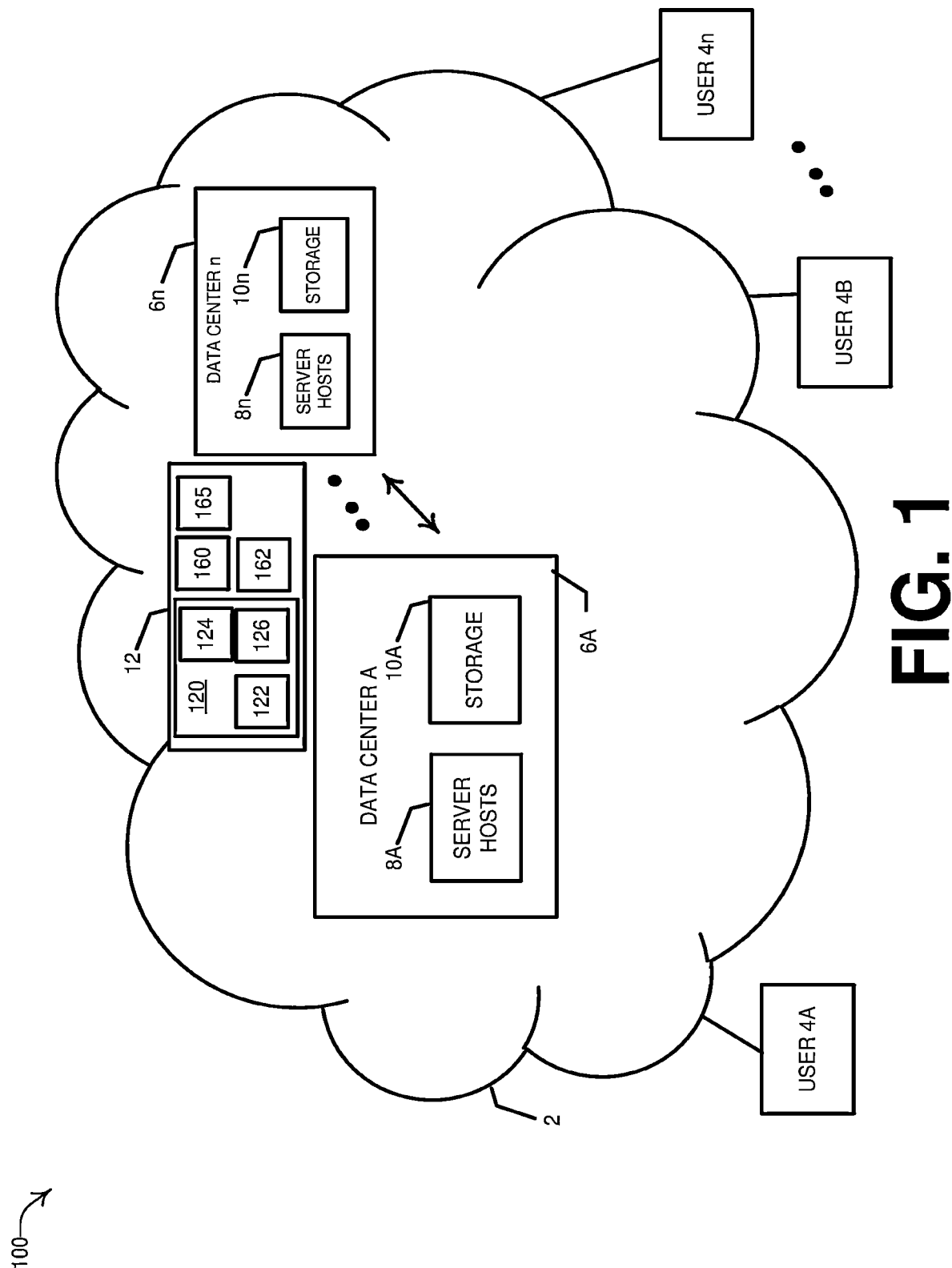
FIG. 1 illustrates an example computing system network environment.

FIG. 1 illustrates a diagram of an example system 100 that comprises network cloud 2 that facilitates users 4A-4n, or user devices corresponding to the users such as computers, smartphones, and the like, being used by the users to access computing resources at one or more data centers 6A-6n. A data center 6 may comprise server hosts 8, which may access or cooperate with user devices 4 to perform or facilitate services, such as computing services, requested by users of the user devices. Examples of computing services may comprise processing services, database services, data storage services, and the like. Computing services provided by server hosts 6, including data storage services, may access one or more network storage equipment 10, either at a data center where a server host obtaining storage services from the network storage is located, or at a different data center. For example, server host 6A may obtain storage services from network storage equipment 10A or network storage equipment 10n.

With some types of network storage equipment, a storage equipment component may be capable of, or may be configured to, detect or determine that a malware software component has infected the storage equipment. With other types of storage equipment, a storage equipment component may not be able to, or may not be configured to, detect or determine that the storage equipment has been infected with a malware software component. Typically, storage equipment, that may comprise a set of components, that is not able to detect an infection is older than storage equipment that is able to, or is configured to, detect an infection of the respective storage component or set of components.

A cloud monitoring system 12, which may comprise a module, a component, or a service, such as, for example a cybersecurity feature of a cloud management suite of services, such as, for example, Cloud IQ offered by Dell Inc., may monitor multiple storage equipment 10 at one or more data centers 6. Monitoring system 12 may comprise equipment, components, modules, and the like, connected to, or communicatively coupled with, or that may be part of, network 2. Monitoring system 12 may comprise memory that can store one or more computer and/or machine readable, writable, and/or executable components 120 and/or instructions. Monitoring system 12 may comprise a computer service and may be referred to as a cloud storage monitoring service. Network 2 may comprise multiple networks, such as an enterprise's private network, a public communication network such the Internet, an individual's home computing network corresponding to firewall, router, or switch, or a wireless communication network such as a 4G or 5G network, and the like.

In embodiments, monitoring system 12 may further comprise processor 160 and storage device 162. In one or more embodiments, computer-executable components 120, when executed by processor 160, can facilitate performance of operations defined by the executable component(s) and/or instruction(s). Computer executable components 120 can include monitoring component 122, determining component 124, communication component 126, and other components described or suggested by different embodiments described herein, that can improve the operation of system 100.

It will be appreciated that in some examples of embodiments, communication between server hosts 8 or user devices 4 and network storage equipment 10 may comprise server message block ("SMB") communication messages. It will also be appreciated that in one or more embodiments other communications protocols may provide similar means for facilitating activity between similarly arranged network equipment.

In some embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 2 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

It will be appreciated that the computer processing systems, computer-implemented methods, apparatus, and computer program products described herein may employ computer hardware and/or software to solve problems that are highly technical in nature (e.g., rapidly evaluating network command activity and controlling communication among devices in different contexts), that are not abstract and cannot be performed as a set of mental acts by a human. For example, a human, or even a plurality of humans, cannot apply criteria to activity of network equipment or a network storage and provide a corrective mitigating action in a timely manner as can various embodiments described herein. Embodiments described herein may enhance the functionality of computing systems and network themselves In one or more embodiments, memory 165 can store computer and/or machine readable, writable, and/or executable components 120 and/or instructions that, when executed by processor 160, can facilitate execution of the various functions described herein relating to monitoring component 122, determining component 124, communication component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of monitoring component 122, which can in some implementations, monitor resource sharing communication between network equipment via a network. As discussed with FIGS. 2-6 below, one or more embodiments can receive (e.g., by monitoring system 12), resource sharing reports regarding communication between server hosts 8 and storage equipment 10.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of determining component 124, which in some implementations can, based on a resource sharing report, detect or determine, by monitoring system 12, a condition of a storage equipment 10 that has a likelihood of indicating a defined adverse event, such as a malware infection, that has at least a threshold likelihood. As discussed with FIGS. 2-6 below, one or more embodiments can, based on the resource sharing communication, determine, by monitoring system 12, a condition of a storage equipment 10 that has at least a threshold likelihood. A malware attack on a storage equipment 10 may be implemented by a process based on, for example, accessing files according to a repeated pattern, accessing files during similar periods of time from one day to the next, or a "tear drop" process (e.g., accessing a small number of files during each of multiple attack events or attempts). A malware attack on a storage equipment 10 may be implemented by, for example, a virus, a trojan horse, a ransomware software component, a rootkit software component, and the like, that may be received from a user deice 4A-4n or a server host 8. Server host computing system 8 shown in FIG. 1 may represent production hosts 51, 53, 55, 57, and 59 shown in FIG. 5. Production host computing systems may be, or may not be, located in data center 10 shown in FIG. 1.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of communication component 126, which can in some implementations, in response to detecting a condition, such as a likelihood of a malware infection of storage equipment 10, manage communication, such as providing an instruction to the storage equipment to suspend, restrict, block, or otherwise minimize access to the storage equipment. In an embodiment, communication component 126 may provide an instruction to storage equipment server host 8 that it may be infected, based on access by the server host of an infected storage equipment, wherein the storage equipment may not be able to determine that the storage equipment has been infected by malware.

It will be appreciated that the embodiments of the subject disclosure depicted in various figures disclosed herein are for illustration only, and as such, the architecture of such embodiments are not limited to the systems, devices, and/or components depicted therein. For example, in some embodiments, monitoring system 12 can further comprise various computer and/or computing-based elements described in reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Monitoring system 12 may execute code instructions that may operate on servers or systems, remote data centers, or 'on-box' in individual client information handling systems, according to various embodiments herein. In some embodiments, any or all implementations of one or more embodiments described herein can operate on a plurality of computers, collectively referred to as monitoring system 12.

Figure 2:
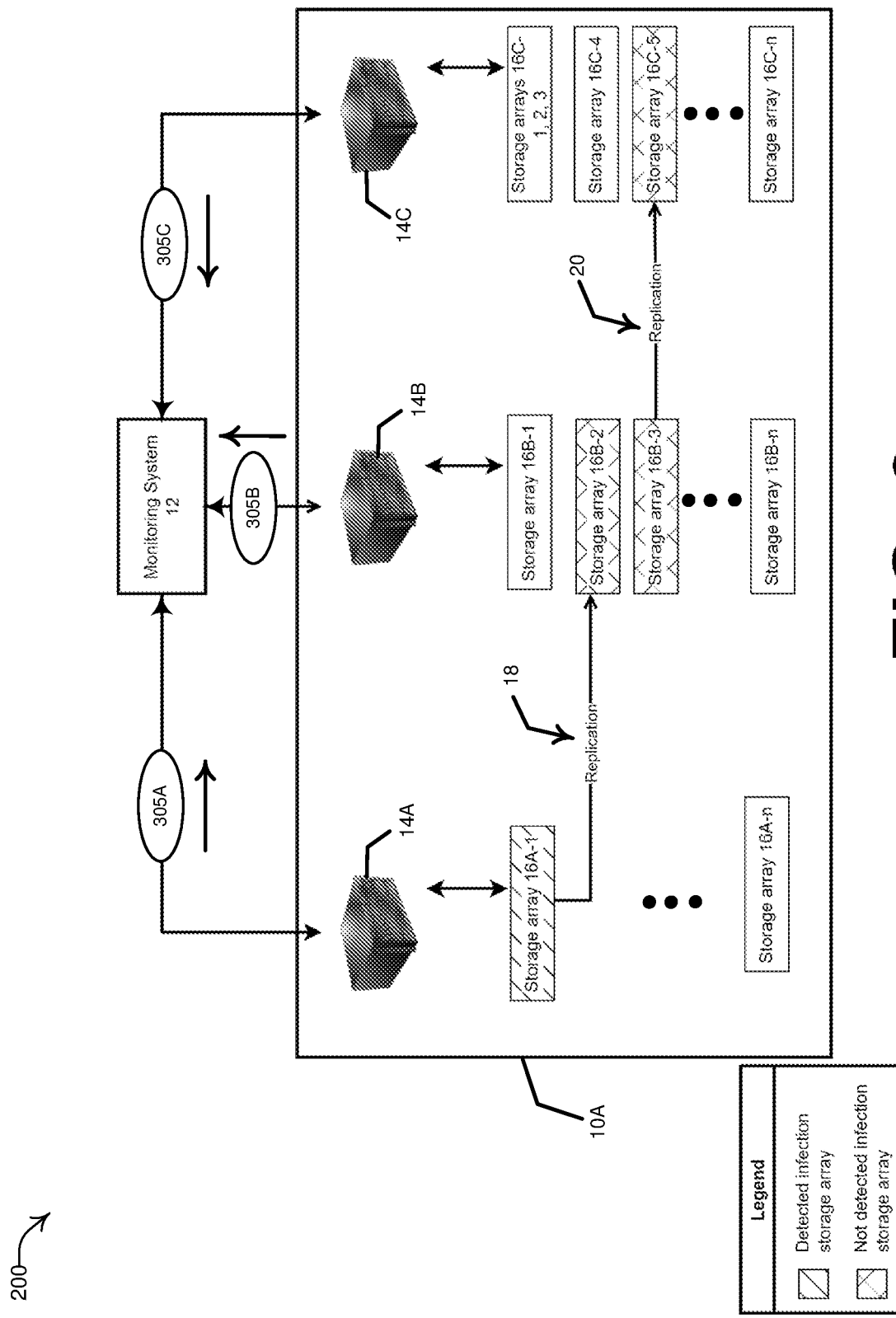
FIG. 2 illustrates a diagram of an example system to monitor components of network storage arrays.

FIG. 2 illustrates an example system 200 that can facilitate determining a malware infection of storage equipment 10, or a component of storage component 10 such as a storage array 16, or a logical volume thereof. System 200 may comprise storage equipment 10A, which may be storage equipment of data center 6A described in reference to FIG. 1. Storage equipment 10A may comprise various components, such as, for example, storage arrays 16 and corresponding storage array management host computing systems 14, which may run management software, for example Unisphere® software offered by Dell Inc.

In embodiments, an array 16 or a management computing system 14 may comprise a processor (e.g., similar to processor 160) and a storage device, (e.g., similar to storage device 162). According to multiple embodiments, an array 16 or a management computing system 14 can further include memory (similar to memory 165) that can store one or more computer and/or machine readable, writable, and/or executable components and/or instructions that, when executed by processor, can facilitate performance of operations defined by the executable component(s) and/or instruction(s). In embodiments, a memory of an array 16 or of a management host computing system 14 can store one or more computer and/or machine readable, writable, and/or executable components and/or instructions, which can, when executed by a processor thereof, facilitate performance of operations defined by the executable component, and other components described or suggested by different embodiments described herein, that can improve the operation of system 200.

In one or more embodiments, computer executable components can be used in connection with implementing one or more of the systems, devices, components, and/or computer-implemented operations shown and described in connection with FIG. 2 or other figures disclosed herein. In an example implementation of data storage equipment 10A, storage array 16A-1 may store executable instructions that can facilitate determination of a malware infection, which capability is depicted by hatched shading of the box representing the array. Array 16B-2, 16B-3, and 16C-5 may not be capable of determining that the arrays have been infected by malware software, which incapability is depicted by cross hatch shading of the boxes representing the arrays in FIG. 2. Replication 18 of data, a data unit, a logical volume, or other portion of data stored on storage equipment array 16A-1 may comprise some of, or all of, data stored on data array 16A-1 to be stored on storage array 16B-2. Replication 20 of data, a data unit, a logical volume, or other portion of data stored on storage equipment array 16B-3 may comprise some of, or all of, data stored on data array 16B-3 to be stored on storage array 16C-5.

Array computing system 14A may transmit or send message 305A to monitoring system 12. Report message 305A may comprise information that notifies, or makes aware, monitoring system 12 of the replication of data corresponding to replication 18. Report message 305A may also comprise information that notifies or makes aware monitoring system 12 of the infection of storage array 16A-1 that the storage array determined. Array management computing system 14B may transmit or send report message 305B to monitoring system 12. Report message 305B may comprise information corresponding to replication 18 and replication 20. However, because, as described above, storage array 16B-2 or storage array 16B-3 are not capable of self-determining a malware infection, report message 305-B may not comprise infection information relative to potential infection of storage array 16B-2 or potential infection of storage array 16B-3, as indicated by cross hatch shading of the boxes representing the potentially infected arrays. It will be appreciated that due to replication 18 and the fact that storage array 16A-1 has been infected by malware, storage array 16B-2 is also potentially, or likely, infected by malware. Similarly, in the embodiment shown in FIG. 2, message 305C, sent by array host management computing system 14C to monitoring system 12 may comprise information pertaining to replication 20 but not information corresponding to a potential malware infection of storage array 16C-5 because the storage array may not be able to self-detect a malware infection.

Figure 3:
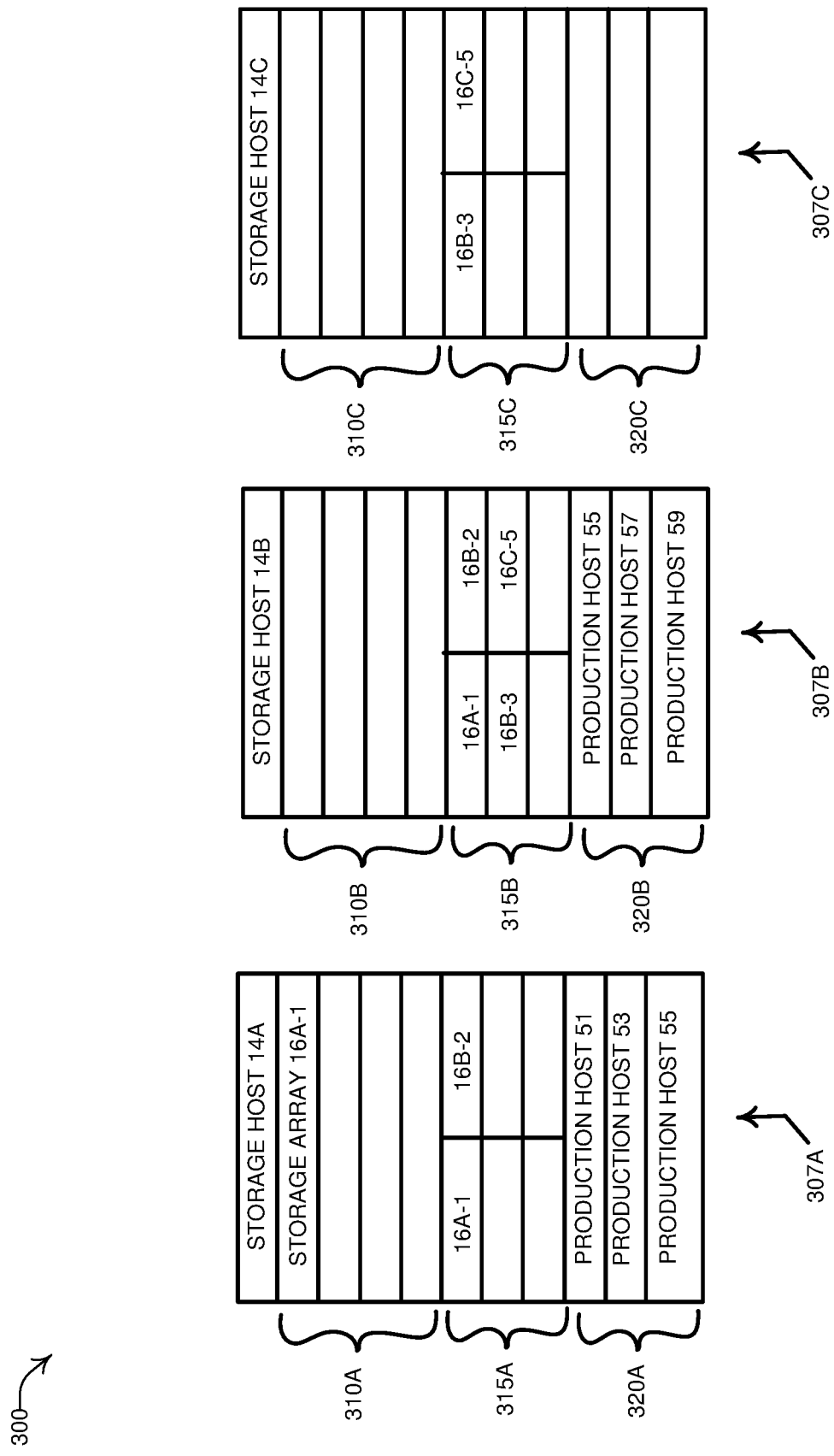
FIG. 3 an example mapping of replication actions among, and detected malware infections at, network storage arrays.
Figure 4:
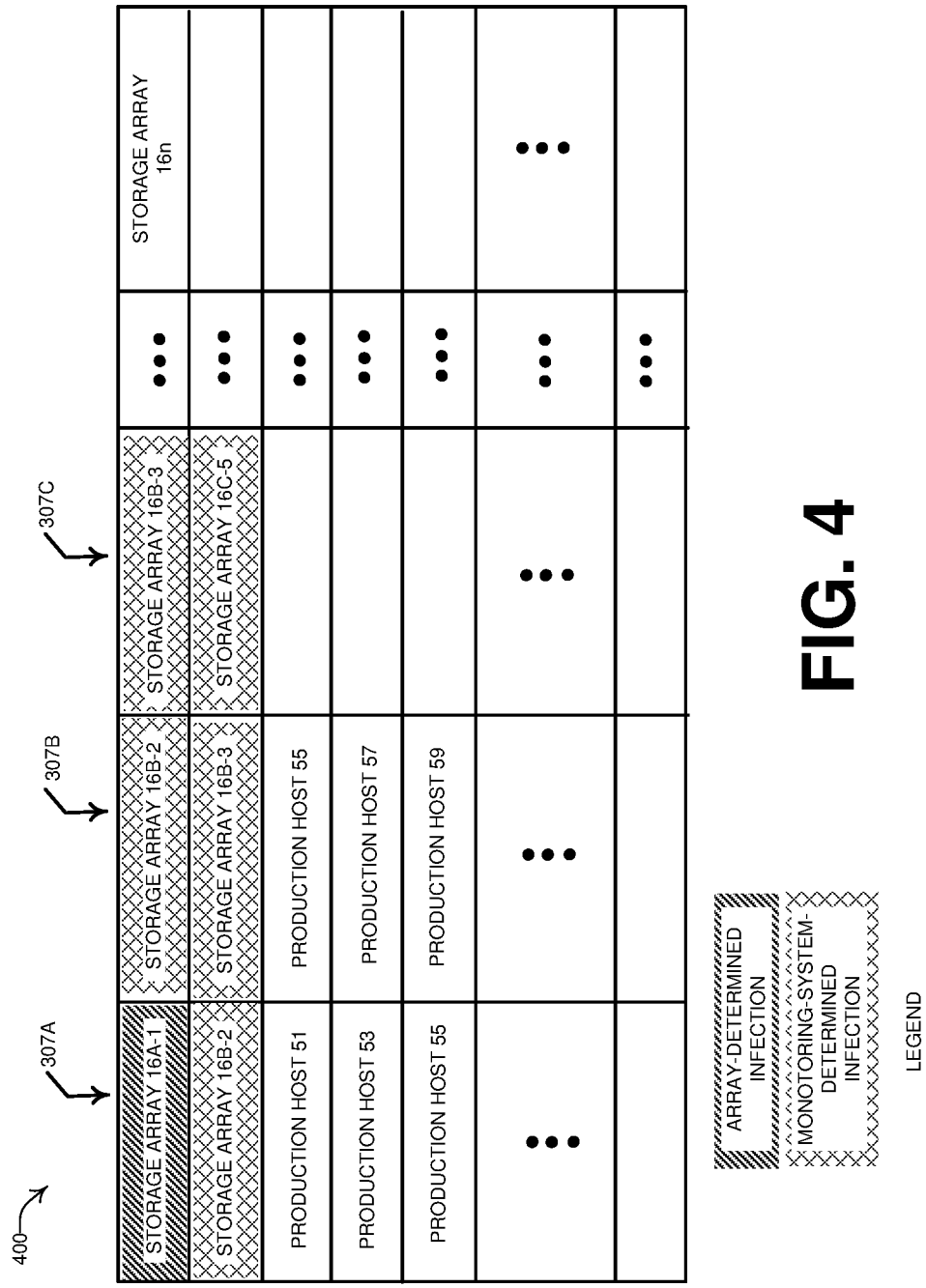
FIG. 4 illustrates an example master mapping of replication actions and malware infections among network storage arrays.

Turning now to FIG. 3, the figure illustrates an example mapping 300 of replication actions among, and detected malware infections at, storage arrays. Mapping 307A may be transmitted via report message 305A by array management host computing system 14A as described in reference to FIG. 2. In FIG. 3, mapping 307A may comprise section 310A that is indicative of storage array 16A-1 having self-determined a malware infection. Section 315A may be indicative of replication 18 as described in reference to FIG. 2. Section 320A may be indicative of production hosts 51, 53, and 55 accessing storage array 16A-1As described in reference to FIG. 5. Mapping 307B is not shown with information in section 310B because, as described in reference to FIG.2, storage array 16B-2 and 16B-3 are not configured to, or are not able to, self-determine a malware infection. However, section 315B may comprise information related to replication 18 and replication 20. Similarly, mapping 307C does not include information in section 310C because storage array 16C-5 is not configured to, or is not capable of, self-determining an infection. However, section 315C may comprise information relative to replication 20.

Figure 5:
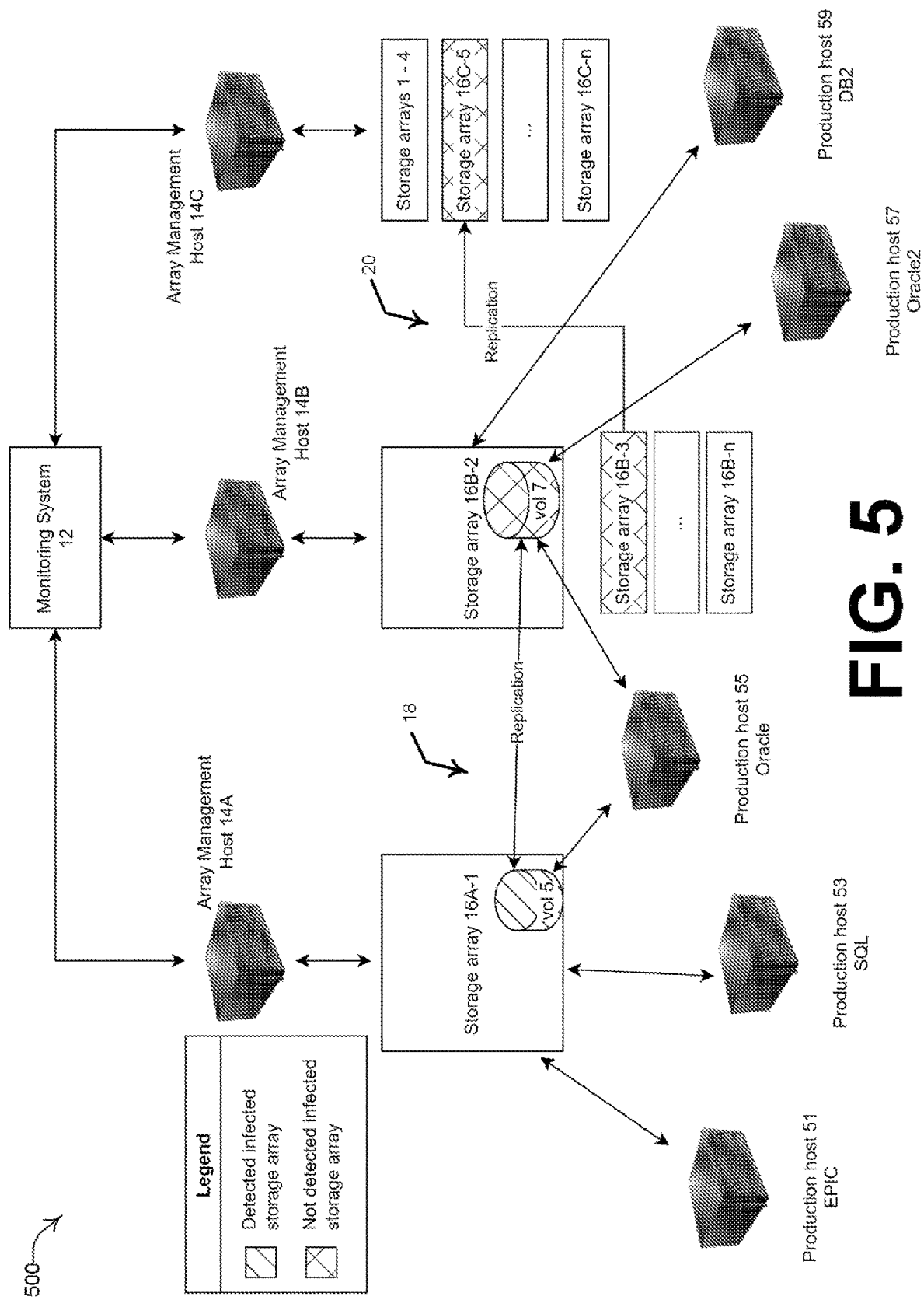
FIG. 5 illustrates a diagram of an example system to restrict access to network storage array component with an inferred infection.

After receiving report messages 305A, 305B, or 305C, monitoring system 12 as described in reference to FIG. 2 may generate a master mapping 400 that may associate replication actions and malware infections among network storage arrays received from one or more of the report messages. As shown in master mapping 400, storage array 16A-1 is indicated in column 309A as being infected with malware via the hatched shading. Storage array 16B-2 is indicated with cross hatch shading to indicate a possible infection due to replication 18, or that storage array 16B-2 may be infected due to one or more of production hosts 51, 53, or 55 having accessed storage array 16A-1 and then having accessed storage array 16B-2, as depicted in FIG. 5. Similarly, storage array 16B-2 and storage array 16B-3 are shown in column 309B shaded with cross hatching to indicate possible infection due to production hosts 55, 57 or 59 having accessed storage array 16B-2, which may be infected due to production host 55 having accessed storage arrays 16A-1 and storage arrays 16B-2. In column 309C of mapping 400, storage array 16B-3 and storage array 16C-5 are shown shaded with crosshatching to indicate possible malware infection due to either replication 20, which replication possibly infected storage array 16B-3 via a replication of data to storage array 16C-5. It will be appreciated that messages 305A, 305B, or 305C may comprise at least one worldwide name ("WWN"), an internet protocol address, or a host name, for example a host bus adapter identifier ("HBA"), corresponding to at least 1 production host computing system 51, 53, 55, 57, or 59 shown in FIG. 5. Thus, monitoring system 12, shown in FIGS. 1, 2, and 5, may send a mitigation instruction to a production host computing system 51, 53, 55, 57, or 59 shown in FIG. 5. Accordingly, based on a malware infection self-detected by storage array 16A-1, and based on information received in report message 305A, 305B, or 305C, monitoring system 12 may use master mapping 400 to infer a malware infection at storage array 16B-2, storage array 16B-3, or storage array 16C-5, even though none of storage array 16B-2, storage array 16B-3, or storage array 16C-5 can self-determine a malware infection. Monitoring system 12 may send a mitigation instruction to at least one of production host computing systems 51, 53, 55, 57, or 59 shown in FIG. 5 based on a determination from master mapping 400 that the at least one production host computing system may have accessed an infected storage array 16. As shown in FIG. 5, only volume 5 may have been the cause of the self-determination of an infection of storage array 16A-1 and replication 18 may have replicated only storage volume 5 to volume 7 of storage array 16B-2 and thus the rest of storage array 16B-2 may not be infected by the malware that infected volume 5. If, based on information contained in report 305C, production host 59 did not access volume 7 in array 16B-2 but accessed another volume/storage unit that has not been determined by monitoring system 12 as being infected, the monitoring system may not direct a mitigation instruction to production host computing system 59. A mitigation instruction message may be directed to a production host computing system according to a host name corresponding to the production host. A logical volume may be distributed across multiple storage arrays.

Figure 6:
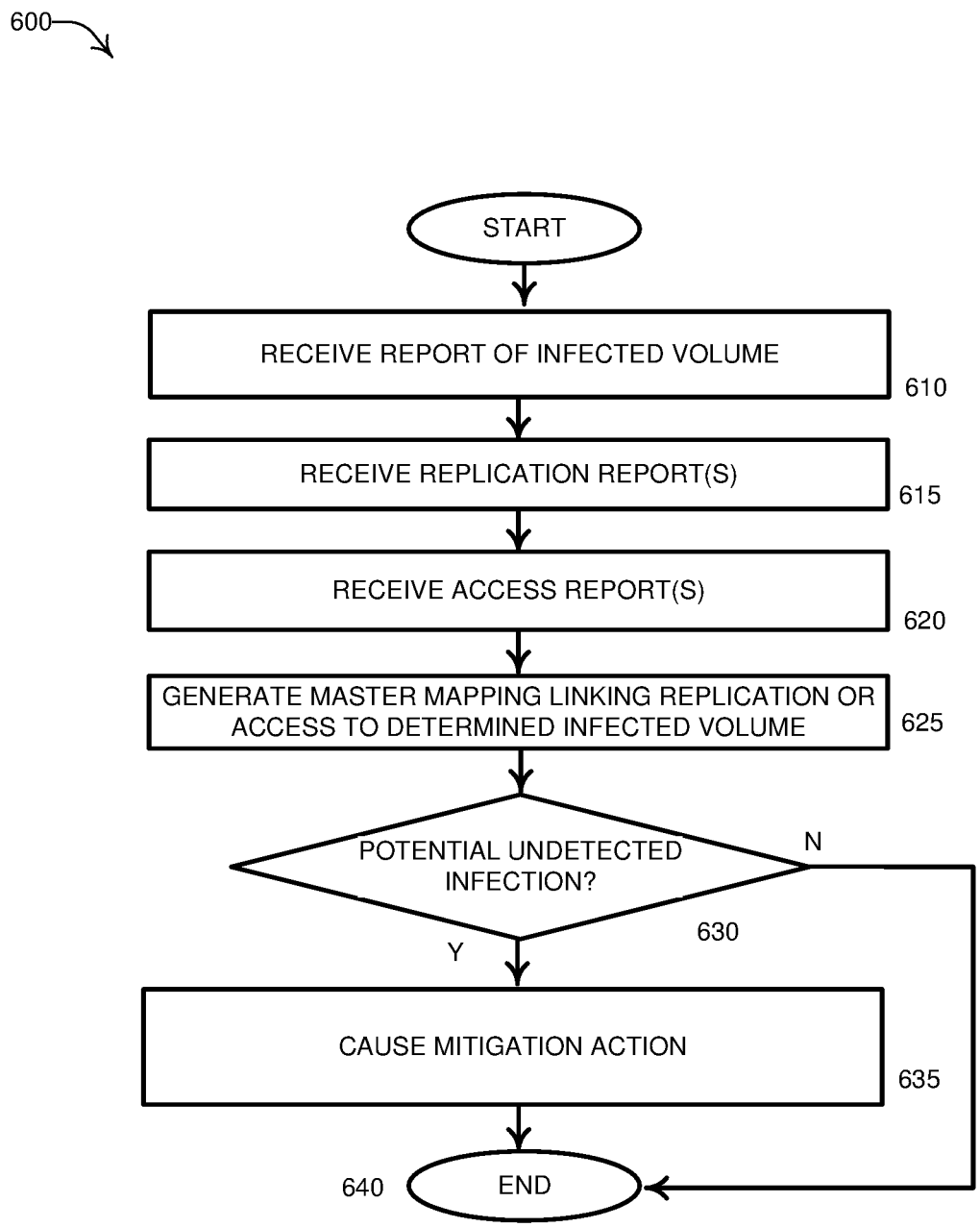
FIG. 6 depicts flow diagram of an example method to monitor network computing storage components and to infer an infection of a network computing storage array component.

Turning now to FIG. 6, the figure illustrates a flow diagram of an example method 600 to monitor network computing storage components and infer an infection of a network computing storage array component, to detect an infection of a storage array, and to cause mitigation of negative effects or impact of such an infection, which may have been transferred from one storage array to another via replication or via access by a server host computing system that may have accessed an infected storage array. In some examples, one or more embodiments of method 600 can be implemented by a monitoring system 12, array management host computing system 14, or storage arrays 16. Method 600 begins at act 605. At act 610, a monitoring system, such as monitoring system 12 described in reference to other figures herein, may receive a report of an infected storage unit, for example the logical volume, of a storage array. The storage array may have self-determined that it has experienced a malware attack or infection. At act 615, the monitoring system may receive one or more replication reports that indicate replication, for example, of a logical volume, from a first storage array to a second storage array. At act 620, the monitoring system may receive an access report indicative of one or more production host computing systems that may have accessed either the first storage array or the second storage array, which second storage array may not be capable of self-determining a malware infection. It will be appreciated that information in reports received at act 615 or act 620 may be received in separate report messages or may be received in a unified report message, such as a report messages 305 described in reference to FIG. 2.

At act 630 of method 600 illustrated in FIG. 6, a determination may be made by the monitoring system whether or not a storage array, a logical volume of a storage array, or a production host system that may have accessed an infected storage array or logical volume may be infected. If a determination made at act 630 is no, method 600 advances to act 640 and ends.

Returning to description of act 630, if a determination is made that a storage array or a production host may have been infected by an infection that was self-determined by a self-determining-capable storage array, and the infection may have propagated to a storage array that is not able to self-determine a malware infection, method 600 advances to act 635. A determination made at act 630 may be based on a replication of data or based on access of a potentially infected storage array or logical volume. At act 635, the monitoring system may cause a mitigation action. For example, the monitoring system may direct a message to an infected array, that may not have self-detected an infection but that the monitoring system may have determined may be infected based on a message 305 received as described in reference to FIG. 2. A mitigation action caused at act 635 may comprise generating or sending an instruction to restrict access by, or to, production hosts, or a mitigation action may comprise generating or sending an instruction to restrict replication of data of a storage array deemed to be infected by monitoring system 12 to other storage arrays. It will be appreciated that a storage array that may be capable of self-determining a malware infection may determine such a malware infection based upon unusual activity, for example SMB commands related to access of the storage array that do not satisfy a determined pattern, criterion, or other determined activity that may not be deemed as satisfactory. After causing a mitigation action at act 635, method 600 advances to act 640 and ends.

Figure 7:
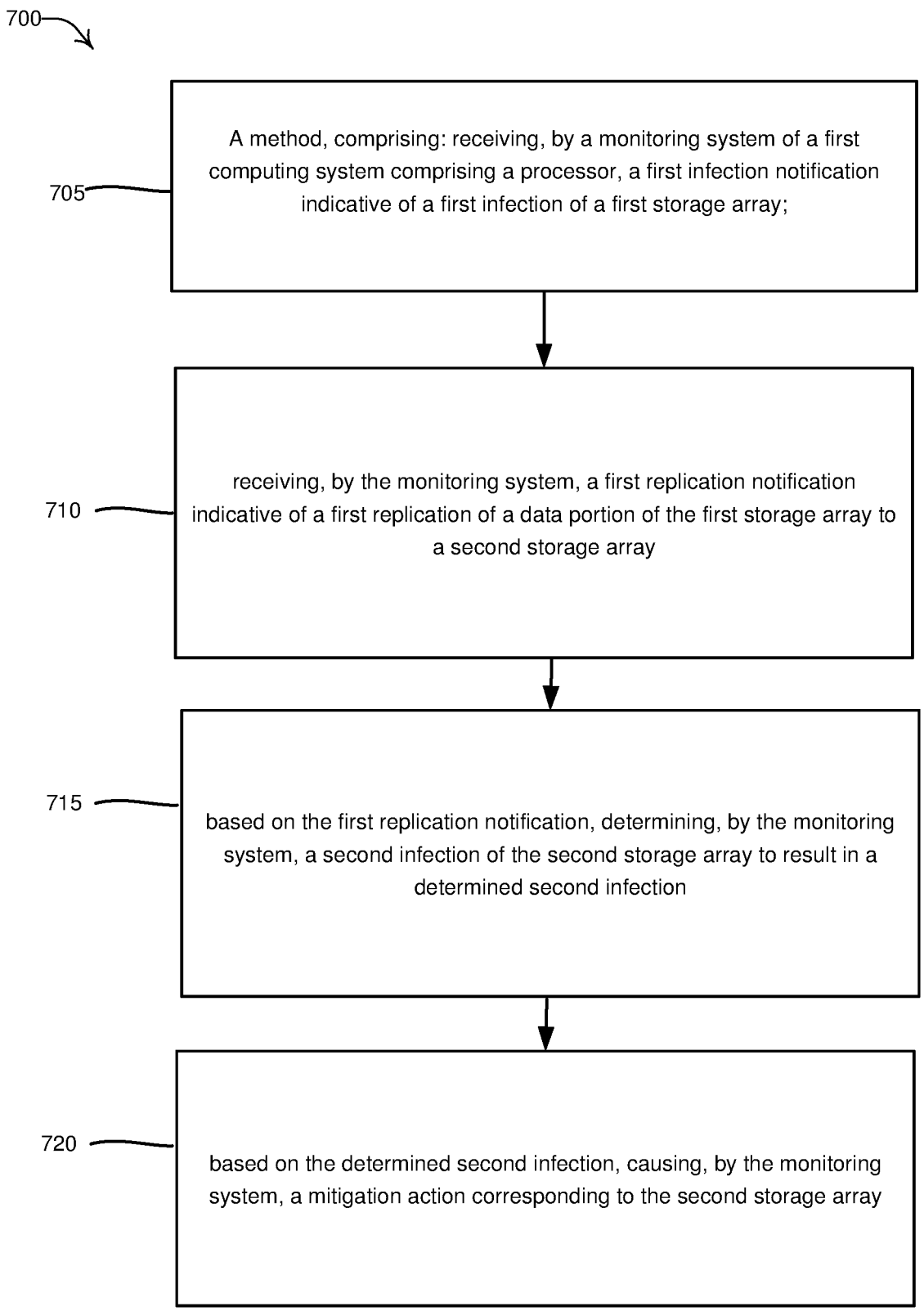
FIG. 7 illustrates an exemplary method embodiment.

Turning now to FIG. 7, the figure illustrates an example embodiment method 700, comprising, at block 705 receiving, by a monitoring system of a first computing system comprising a processor, a first infection notification indicative of a first infection of a first storage array; at block 710 receiving, by the monitoring system, a first replication notification indicative of a first replication of a data portion of the first storage array to a second storage array; at block 715 based on the first replication notification, determining, by the monitoring system, a second infection of the second storage array to result in a determined second infection; and at block 720 based on the determined second infection, causing, by the monitoring system, a mitigation action corresponding to the second storage array.

Figure 8:
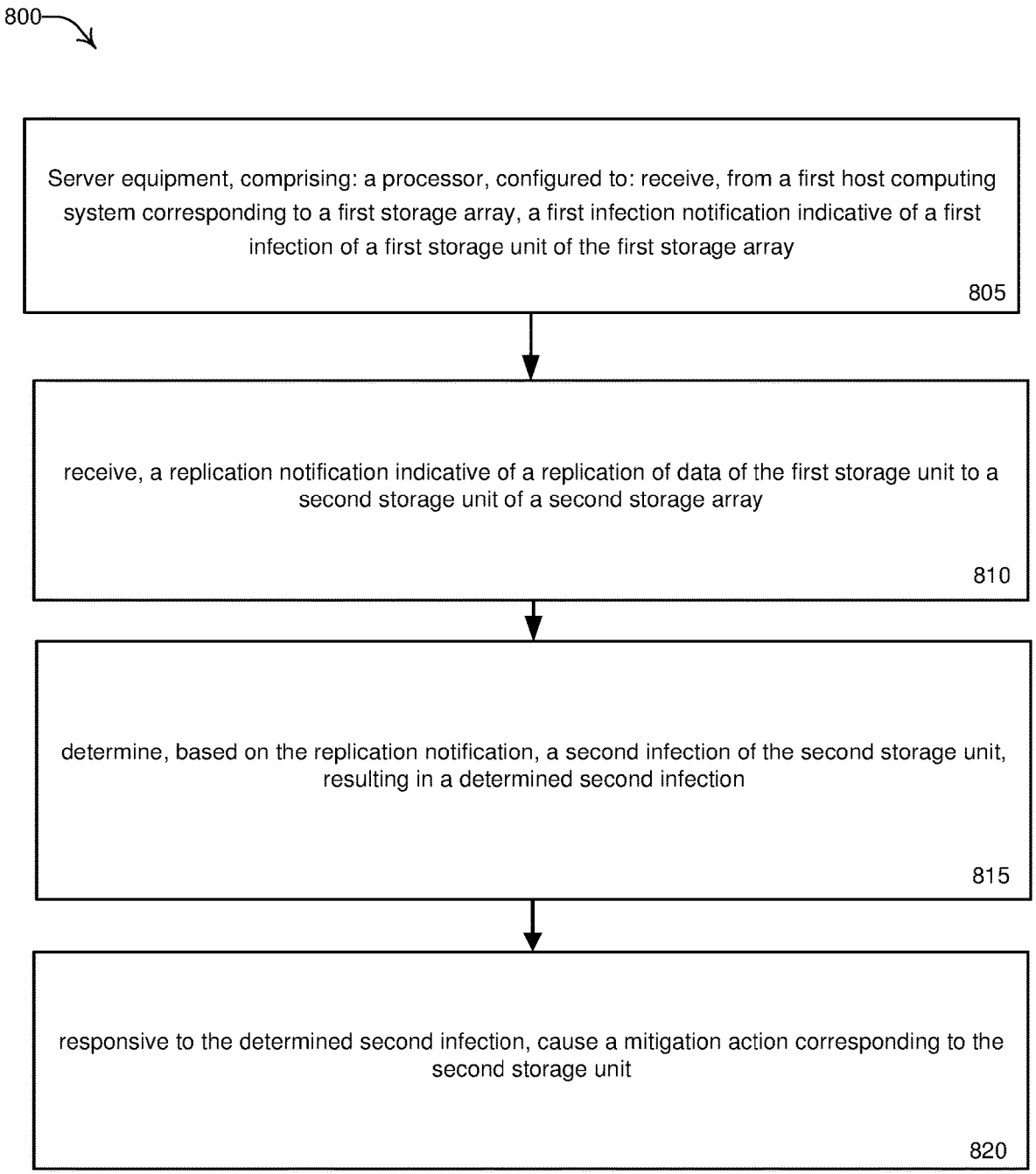
FIG. 8 illustrates an exemplary server system embodiment.
Figure 9:
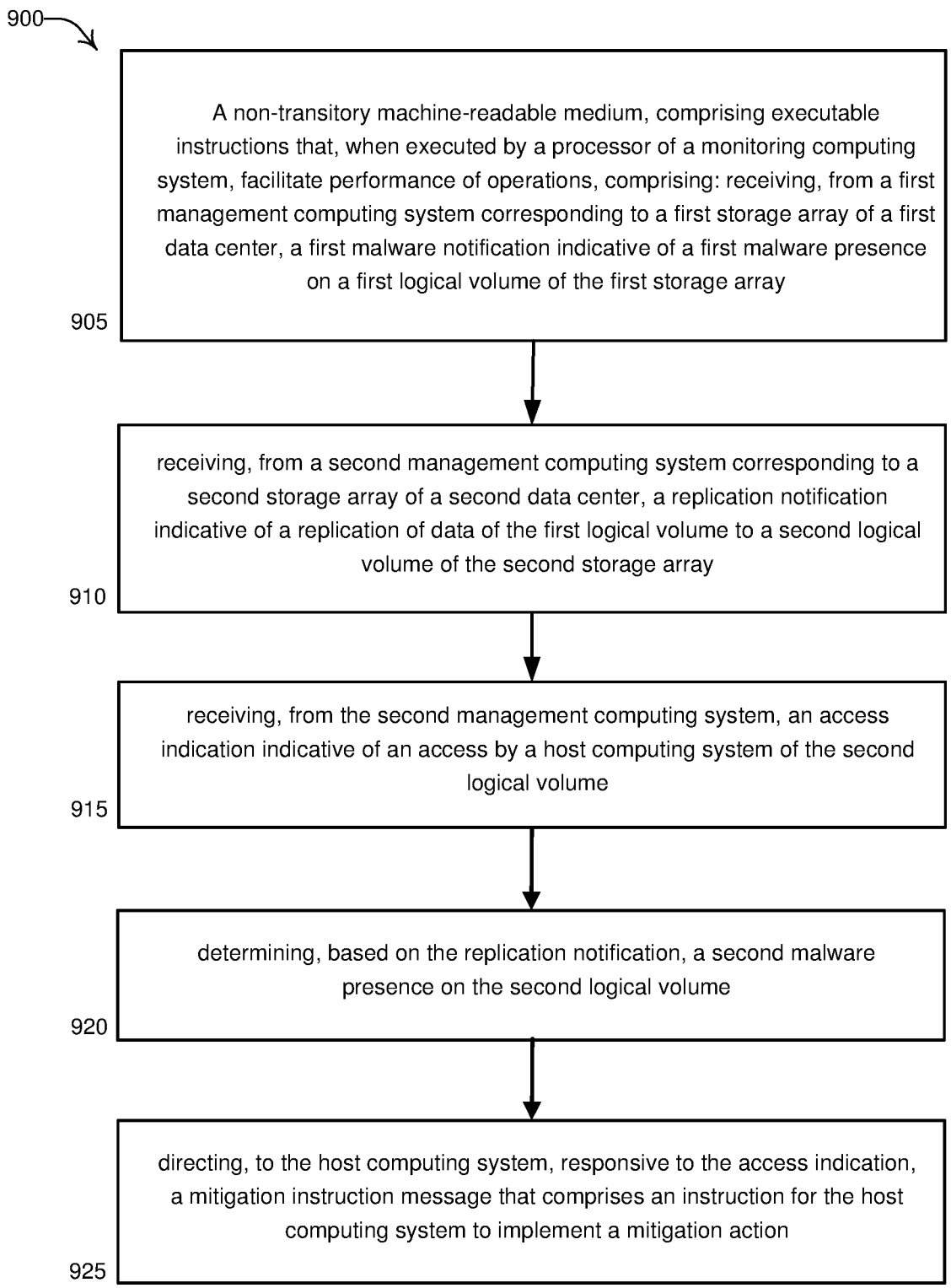
FIG. 9 illustrates an exemplary non-transitory machine-readable medium embodiment.

Turning now to FIG. 8, the figure illustrates server equipment 800, comprising, at block 805 a processor, configured to receive, from a first host computing system corresponding to a first storage array, a first infection notification indicative of a first infection of a first storage unit of the first storage array, at block 810 the processor is further configured to receive a replication notification indicative of a replication of data of the first storage unit to a second storage unit of a second storage array; at block 815 the processor is further configured to determine, based on the replication notification, a second infection of the second storage unit, resulting in a determined second infection; and at block 820 the processor is configured to, responsive to the determined second infection, cause a mitigation action corresponding to the second storage unit Turning now to FIG. 9 the figure illustrates an example non-transitory machine-readable medium 900, comprising at executable instructions that, when executed by a processor of a monitoring computing system, facilitate performance of operations, comprising block 905 receiving, from a first management computing system corresponding to a first storage array of a first data center, a first malware notification indicative of a first malware presence on a first logical volume of the first storage array; at block 910 receiving, from a second management computing system corresponding to a second storage array of a second data center, a replication notification indicative of a replication of data of the first logical volume to a second logical volume of the second storage array; at block 915 receiving, from the second management computing system, an access indication indicative of an access by a host computing system of the second logical volume; at block 920 determining, based on the replication notification, a second malware presence on the second logical volume; and at block 925 directing, to the host computing system, responsive to the access indication, a mitigation instruction message that comprises an instruction for the host computing system to implement a mitigation action.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
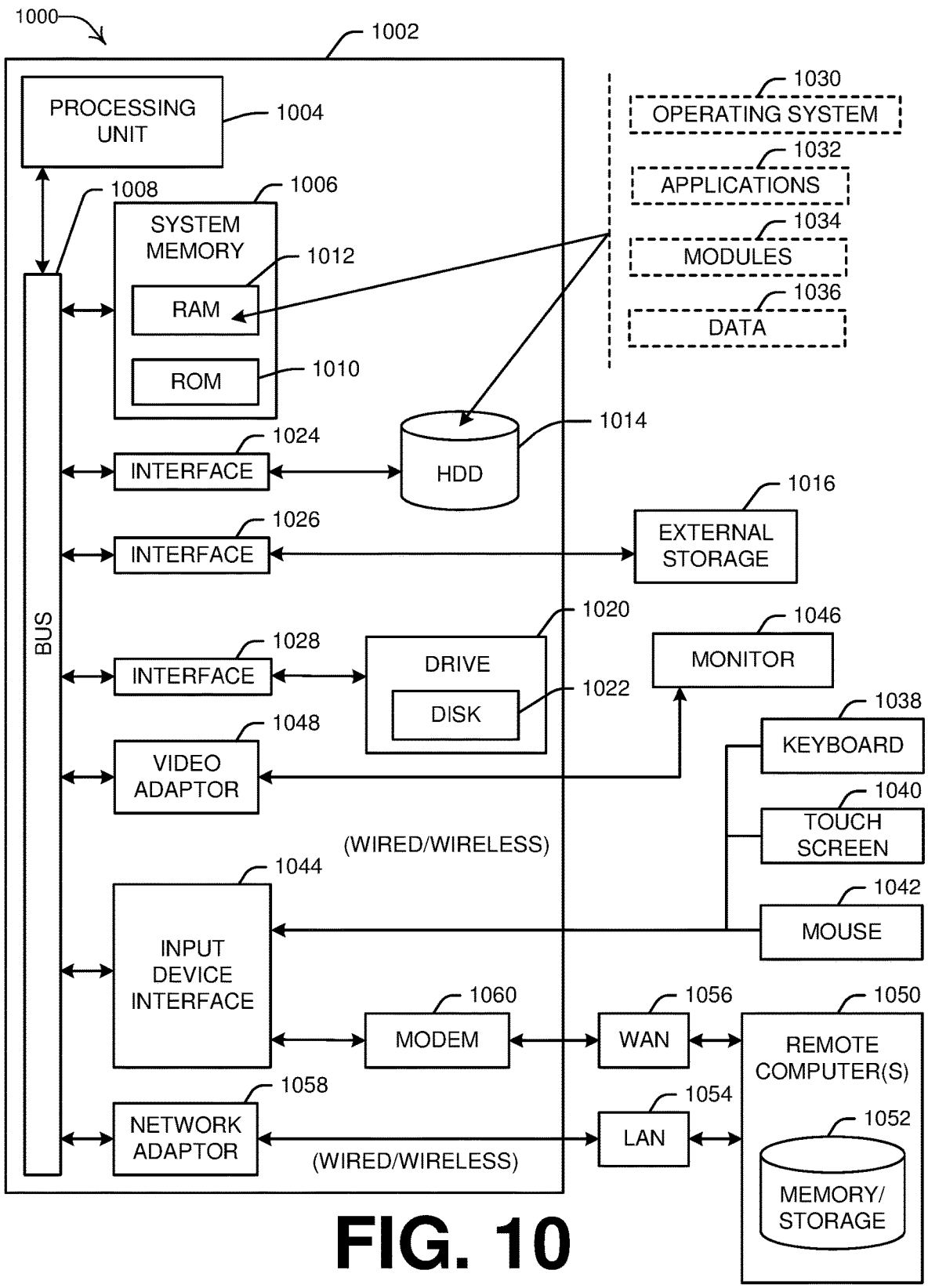
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    receiving, by a monitoring system of a first computing system comprising a processor, a first infection notification indicative of a first infection of a first storage array;
    receiving, by the monitoring system, a first replication notification indicative of a first replication of a data portion of the first storage array to a second storage array;
    generating, by the monitoring system, a mapping indicative of an association of the first replication and the first infection;
    based on the association of the first replication and the first infection, determining, by the monitoring system, a second infection of the second storage array to result in a determined second infection; and
    based on the determined second infection, causing, by the monitoring system, a mitigation action, with respect to a second computing system, corresponding to the second storage array,
    wherein the first storage array is configured to be able to detect infection, and wherein the second storage array is unable to detect infection.

2. The method of claim 1, wherein the first infection is determined by the first storage array.

3. The method of claim 1, wherein the mitigation action comprises restricting access to the second storage array.

4. The method of claim 1, further comprising:
    receiving, by the monitoring system, a first access indication indicative of accessing of the first storage array by the second computing system, wherein the first access indication is generated by the first storage array, and wherein the first access indication comprises a host name corresponding to the second computing system; and
    receiving, by the monitoring system, a second access indication, indicative of accessing of the second storage array by the second computing system, wherein the second access indication is generated by the second storage array, and wherein the mitigation action comprises directing, to the host name, an infection alert indicative of possible infection of the second computing system.

5. The method of claim 1, wherein the mitigation action comprises directing an infection alert to the second computing system that has accessed the second storage array, and wherein the infection alert is indicative of possible infection of the second computing system due to access by the second computing system of the second storage array.

6. The method of claim 5, wherein the first access indication comprises a host name corresponding to the second computing system and wherein the infection alert is directed to the host name.

7. The method of claim 5, wherein the second computing system comprises a production host computing system.

8. The method of claim 1, further comprising:
    receiving, by the monitoring system, a first access indication indicative of accessing of the first storage array by the second computing system; and
    receiving, by the monitoring system, a second access indication indicative of accessing of the second storage array by the second computing system, wherein the determining of the determined second infection is based on the first access indication and the second access indication.

9. The method of claim 1, further comprising:
receiving, by the monitoring system, a first access indication indicative of access, by the second computing system, of the data portion,
wherein the mitigation action comprises notifying the second computing system of the determined second infection.

10. The method of claim 1, further comprising:
receiving, by the monitoring system, a first access indication indicative of access by the second computing system of a third storage array;
determining, by the monitoring system, that the third storage array is configured to receive a second replication of the data portion;
generating, by the monitoring system, a third infection notification corresponding to the third storage array based on the third storage array being configured to receive the second replication; and
causing, by the monitoring system, a mitigation action corresponding to the third storage array.

11. The method of claim 1, wherein the first replication is performed according to an Active-Active replication operation.

12. The method of claim 1, wherein the first replication is performed according to a data push replication operation.

13. The method of claim 1, wherein the data portion is a portion of a storage unit that comprises a logical volume, and wherein the first replication comprises replicating of the storage unit to the second storage array.

14. The method of claim 1, wherein the second storage array is a storage array type that is not able to detect or determine that the second storage array has been infected with malware.

15. Server equipment, comprising:
a processor, configured to:
receive, from a first host computing system corresponding to a first storage array, a first infection notification indicative of a first infection of a first storage unit of the first storage array;
receive, a replication notification indicative of a replication of data of the first storage unit to a second storage unit of a second storage array;
generate a master mapping indicative of an association of the first replication and the first infection
determine, based on the master mapping, a second infection of the second storage unit, resulting in a determined second infection; and
responsive to the determined second infection, cause a mitigation action corresponding to the second storage unit,
wherein the first storage array is able to self-determine an infection, and wherein the second storage array is unable to self-determine infection.

16. The server equipment of claim 15, wherein the second storage array corresponds to a second host computing system that receives, from the second storage array, an access indication that is indicative of access of the first storage unit by a third host computing system,
wherein the processor of the server equipment is further configured to receive the access indication from the second host computing system,
wherein the access indication comprises a host name corresponding to the third host computing system, and
wherein the determined second infection is determined based on the access indication.

17. The server equipment of claim 15, wherein the first infection notification is determined by the first storage array based on one or more server message block commands determined by the first storage array to violate a configured infection detection criterion.

18. A non-transitory machine-readable medium, comprising executable instructions that, when executed by a processor of a monitoring computing system, facilitate performance of operations, comprising:
receiving, from a first management computing system corresponding to a first storage array of a first data center, a first malware notification indicative of a first malware presence on a first logical volume of the first storage array;
receiving, from a second management computing system corresponding to a second storage array of a second data center, a replication notification indicative of a replication of data of the first logical volume to a second logical volume of the second storage array;
receiving, from the second management computing system, an access indication indicative of an access by a host computing system of the second logical volume;
generating, by the monitoring computing system, a master mapping indicative of an association of the replication, the first malware presence, and the access;
determining, based on the master mapping, a second malware presence on the second logical volume; and
directing, to the host computing system, responsive to the access indication, a mitigation instruction message that comprises an instruction for the host computing system to implement a mitigation action,
wherein the first storage array is able to self-determine infection, and wherein the second storage array is unable to self-determine infection.

19. The non-transitory machine-readable medium of claim 18, wherein the host computing system is not located at the first data center or the second data center, wherein the access indication comprises a host name corresponding to the host computing system, and wherein the mitigation instruction message is directed to the host name.

20. The non-transitory machine-readable medium of claim 18, wherein the first storage array is configured to detect malware and wherein the second storage array is not configured to detect malware.

* * * * *